(No Model.)
M. TIDD.
VEHICLE WHEEL HUB.
No. 279,892. Patented June 19, 1883.
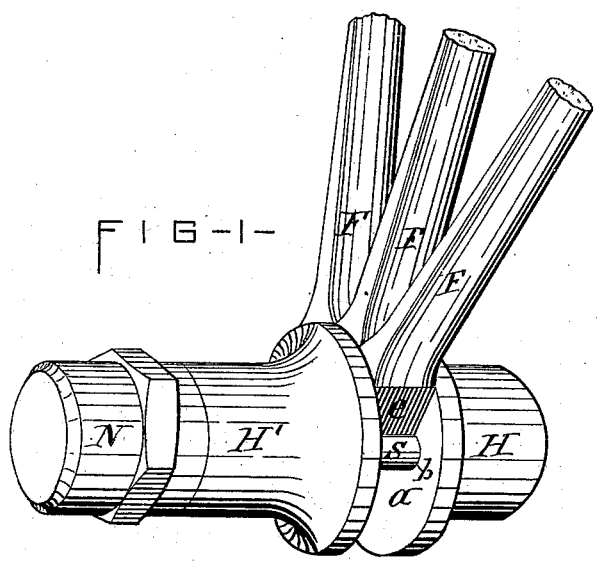
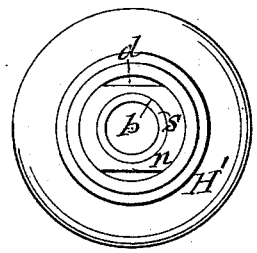
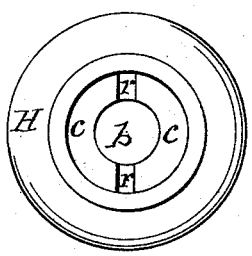
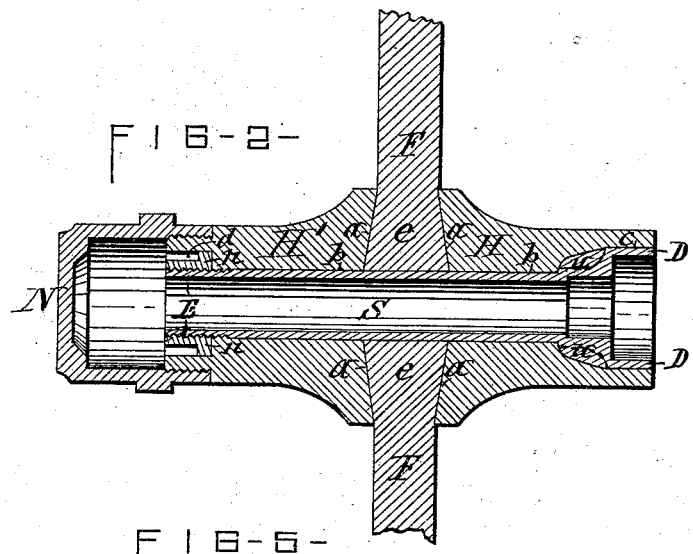
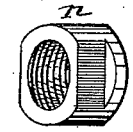
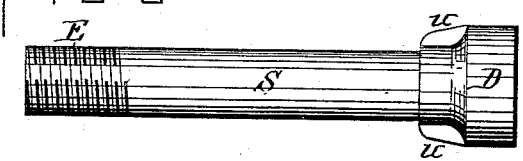
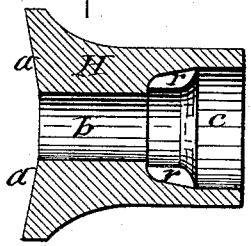
WITNESSES—
W. E. Raymond.
F. H. Gibbs
INVENTOR—
Milton Tidd
per Duell, Laasst H
his Attys

UNITED STATES PATENT OFFICE.

MILTON TIDD, OF SENECA FALLS, NEW YORK, ASSIGNOR OF ONE-HALF TO JACOB C. VREELAND, OF SAME PLACE.

VEHICLE-WHEEL HUB.

SPECIFICATION forming part of Letters Patent No. 279,892, dated June 19, 1883.

Application filed November 25, 1882. (No model.)

*To all whom it may concern:*

Be it known that I, MILTON TIDD, of Seneca Falls, in the county of Seneca, in the State of New York, have invented new and useful Improvements in Wagon-Wheels, of which the following, taken in connection with the accompanying drawings, is a full, clear, and exact description.

This invention relates to that class of wheels in which the spokes are clamped between adjustably-connected end sections of a transversely-divided hub.

My improvements consist in novel means for fastening the sleeve or axle-box in the hub, so as to prevent the former from turning on the latter and while tightening the nut on said sleeve; and it also consists in a novel arrangement of said nut in a cavity in the end of the hub, whereby the screw-threads of the sleeve and the nut connected therewith are perfectly housed and protected from dust and liability of being disturbed, my said improvements also possessing the advantages over all other sectional hubs, in that it forms a hub of solid end sections which are devoid of transverse joints, and adapted to be constructed of either metal or wood, all as hereinafter more fully described, and set forth in the claims.

The invention is fully illustrated in the accompanying drawings, wherein Figure 1 is a perspective view of my improved wheel-hub and its connection with the spokes. Fig. 2 is a longitudinal section of the same. Fig. 3 is a front end view of the hub with the usual dust-cap removed. Fig. 4 is a rear end view of the same with the sleeve removed. Fig. 5 is a detached view of the journal-box or sleeve. Fig. 6 is a detached longitudinal sectional view of the rear section of the hub, and Fig. 7 is a perspective view of the nut by which the hub-sections are clamped against the spokes.

Similar letters of reference indicate corresponding parts.

H and H' represent the two end sections or front and rear portions, respectively, of the wheel-hub, said sections being provided with an axial bore, *b*, in which is inserted and closely fitted a journal-box or sleeve, S, extending the length of the hub and constituting the axial bearing for the wheel. The rear end of the sleeve S is formed with a collar, D, which is fitted in a corresponding cavity, *c*, in the rear end of the hub-section H. The opposite or front end, E, of the sleeve is screw-threaded externally, and on this end is a nut, *n*, fitted in a recess, *d*, in the front end of the hub-section H', and provided with a proper end bearing against the said hub-section, said recess *d* forming a housing over the nut *n* and effectually guarding against entrance of dust and grit to the screw-threads of the sleeve, and also against disturbance of the nut. The adjacent faces *a a* of the two hub-sections H H' are recessed or made concave, as shown in Fig. 2 of the drawings, and between the said faces are inserted the spokes F F, the inner ends, *e*, of which are made dovetail shape, so as to fit closely to the concave faces *a a* of the hub-sections H H', and at the same time rest on the sleeve S, and thus receive a most substantial end support.

The ends *e* of the spokes are placed in direct contact with each other, and are properly beveled toward the center of the axle to fit closely side by side and completely fill the space around the sleeve S. The spokes are clamped between the hub-sections H H', either directly by tightening the nut *n* on the end of the sleeve S or by placing the hub between the jaws of an extra clamp, and thereby pressing the two sections H H' against the interposed ends of the spokes until properly tightened, and then setting up the nut *n* to retain the hub-sections in their position.

It will be observed that the dovetailed spokes clamped in the hub and seated upon the sleeve S in the manner before described receive a longer and better bearing and a more secure hold in the hub than is afforded by the ordinary construction of wheels, and the lubricant of the axle has no access to the clamped ends of the spokes, thus obviating all tendency of the spokes working loose in the hub. Furthermore, a wheel constructed as aforesaid allows the spokes to be removed and replaced without removing the tire of the wheel, the same being effected by merely removing the nut *n* and front section, H', of the hub, which then allows one or more spokes to be drawn away from the rear hub-section, H, and completely out of the wheel, and as readily replaced and secured by setting up the front hub-section, H′, and nut n, as before described.

The dish of the wheel can be obtained by increasing the angle or of deepening the concavity in the rear hub-section, H. In order to prevent the sleeve S from turning in the hub, I provide the rear end of the latter with feathers or splines u and fit the same in corresponding slots, r, in the hub-section H.

N represents the usual dust-cap, applied in the ordinary way to the outer or front end of the hub. The wheel may be secured on the axle which passes through the sleeve S either by a nut or linchpin applied to the outer end of the axle in any of the well-known manners.

The hub-sections H H′ may be composed either of metal or of wood. If of the latter material, said sections are to be properly banded.

Having described my invention, what I claim as new, and desire to secure by Letters Patent, is—

1. In combination with the spokes F, hub-section H, and sleeve S, the hub-section H′, provided with the cavity d, and the nut n, housed in said cavity, substantially as described and shown.

2. In combination with spokes F, having dovetailed ends e, fitted against each other, as shown, the hub-sections H H′, provided with concave faces a, bore b, cavities c and d, and slots r r, the sleeve S, provided with the collar D, feather u, and screw-threaded end E, and the nut n, housed in the cavity d, substantially as described and shown, for the purpose set forth.

In testimony whereof I have hereunto signed my name and affixed my seal, in the presence of two attesting witnesses, at Syracuse, in the county of Onondaga, in the State of New York, this 13th day of November, 1882.

MILTON TIDD. [L. S.]

Witnesses:
WM. C. RAYMOND,
F. H. GIBBS.